United States Patent [19]

Marlin et al.

[11] Patent Number: 5,758,074
[45] Date of Patent: May 26, 1998

[54] SYSTEM FOR EXTENDING THE DESKTOP MANAGEMENT INTERFACE AT ONE NODE TO A NETWORK BY USING PSEUDO MANAGEMENT INTERFACE, PSEUDO COMPONENT INTERFACE AND NETWORK SERVER INTERFACE

[75] Inventors: James Warden Marlin, Longmont; Raymond Lowell Knudson; Thomas Michael Ruehle, both of Boulder; Anthony Franke Stuart, Jamestown; Edward Thomas Hughes, III, Arvada, all of Colo.

[73] Assignee: International Business Machines Corporation, Armonk, N.Y.

[21] Appl. No.: 334,948

[22] Filed: Nov. 4, 1994

[51] Int. Cl.⁶ ............................................. G06F 13/10
[52] U.S. Cl. ................................. 395/200.8; 395/333
[58] Field of Search .......................... 364/200; 395/200, 395/650, 700, 333, 712, 200.8

[56] References Cited

U.S. PATENT DOCUMENTS

| | | | |
|---|---|---|---|
| 4,251,858 | 2/1981 | Cambigue et al. | 364/102 |
| 4,495,572 | 1/1985 | Bosen | 364/200 |
| 4,633,387 | 12/1986 | Hartung et al. | 364/200 |
| 4,862,345 | 8/1989 | Lekron | 364/188 |
| 4,933,967 | 6/1990 | Lo et al. | 379/207 |
| 4,941,091 | 7/1990 | Breault et al. | 364/406 |
| 4,969,093 | 11/1990 | Barker et al. | 364/900 |
| 5,008,827 | 4/1991 | Sansone et al. | 364/464.02 |
| 5,077,694 | 12/1991 | Sansone et al. | 395/600 |
| 5,157,783 | 10/1992 | Anderson et al. | 395/600 |
| 5,220,674 | 6/1993 | Morgan et al. | 395/800 |
| 5,261,098 | 11/1993 | Katin et al. | 395/650 |
| 5,291,602 | 3/1994 | Barker et al. | 395/700 |
| 5,307,490 | 4/1994 | Davidson et al. | 395/650 |
| 5,329,619 | 7/1994 | Page et al. | 395/200 |
| 5,381,470 | 1/1995 | Cambray et al. | 379/216 |
| 5,398,336 | 3/1995 | Tantry et al. | 395/600 |
| 5,406,322 | 4/1995 | Port et al. | 348/15 |
| 5,423,003 | 6/1995 | Bertrau | 395/200 |
| 5,442,791 | 8/1995 | Wrabetz et al. | 395/650 |
| 5,481,721 | 1/1996 | Serlet et al. | 395/700 |
| 5,511,197 | 4/1996 | Hill et al. | 395/700 |

FOREIGN PATENT DOCUMENTS 5-265952  10/1993  Japan.

OTHER PUBLICATIONS

*DMTF*, (Aug. 29, 1994), "Desktop Management Interface Specification—Version 1.0".

(List continued on next page.)

*Primary Examiner*—Thomas C. Lee
*Assistant Examiner*—David Ton
*Attorney, Agent, or Firm*—Charles E. Rohrer

[57] ABSTRACT

A system for enabling the use of the Desktop Management Interface (DMI) in a network where the particular computing system containing the DMI and its database reside on one node and where management applications and devices (instrumented components) reside at other nodes. A client interface is established at each of the required client platforms by supporting all of the functions of the management interface (MI) and/or component interface (CI) at the platforms. In that manner, the management application can address the client management interface at its own node as though it were on the DMI node. The client MI issues a "Remote Procedure Call" (RPC) using network protocol to address the DMI node. A server agent at the DMI node receives the call and acts as a proxy management application to address the DMI and its database. Similarly, instrumented components can address the client component interface at its own node as though it were on the DMI node. The client CI issues an RPC to address the DMI node. A server agent at the DMI node receives the call and acts as a proxy component to address the DMI and its database. In that manner, the semantics and syntax of the DMI is preserved while enabling three-way dialogues between clients, servers and instrumented components all residing on different nodes which may have a variety of operating systems, hardware platforms and architectures.

17 Claims, 7 Drawing Sheets

OTHER PUBLICATIONS

*DMTF* (Oct. 31, 1994), "Large Mailing Operations Standards Specification—Version 1.0".

Steve Moore, "IBM Pledges Desktop Interface Support," Computerworld, vol. 28, Issue 44, Oct. 31, 1994.

David Buerger, "Back to Reality," Network World, vol. 11, Issue 42, Oct. 17, 1994.

Skip McAskill, "DMTF Finalizes Desktop Management Specification," Network World, vol. 11, Issue 17, Apr. 25, 1994.

Shannon Gray–Voigt, "Bringing Standard Management to Desktop Computing," Network World, vol. 11, Issue 44, Oct. 31, 1994.

SYSTEM FOR EXTENDING THE DESKTOP MANAGEMENT INTERFACE AT ONE NODE TO A NETWORK BY USING PSEUDO MANAGEMENT INTERFACE, PSEUDO COMPONENT INTERFACE AND NETWORK SERVER INTERFACE

This application relates to the automated management of a complex environment and more particularly to the porting of the management interface of the Desktop Management Interface Standard (DMI) to every node on a network which has management capability and the porting of a component interface of the DMI to every node on the network which has a device or process to be managed.

CROSS REFERENCE TO RELATED APPLICATIONS

Several patent applications filed concurrently herewith relate to the invention herein. They are patent application Ser. No. 08/334,592 entitled, "Instrumented Components for Accessing Complex Object-oriented Data Files", now U.S. Pat. No. 5,546,577; patent application Ser. No. 08/334,584 entitled "Desktop Management of Host Applications", now pending; and patent application Ser. No. 08/334,810 entitled "Table Driven Graphical User Interface".

BACKGROUND OF THE INVENTION

The desire to develop control technologies in order to produce end-products more efficiently, or more cheaply, or of higher quality has existed for many years. Machines utilizing mechanical controls, hydraulic controls, or pneumatic controls were developed in the eighteenth century. With the advent of electrical technology, the increased ability to control the movement of work pieces from one work station to another down conveyor lines enabled a significant advance in the cost, efficiency and quality objectives of control technology. With the development of computers, particularly general purpose computers, control technology became much more flexible. Improvements in the control of a process could be effected by changes in software, as opposed to changes in hardware which were necessary on the earlier systems. Also, computer technology brought about the ability to automate processes not previously subject to machine control. For example, accounting work that was previously done by hand with the aid of simple adding machines or other calculating devices of that sort were automated by computerized systems to produce end-products in a much more efficient and less costly manner. The preparation of documents has been automated to some extent by the use of word processors. Generally speaking, computers have enabled the automation of information processes much the same as in an earlier day the electrical technology enabled the automatic movement of work pieces down a conveyor line.

The continued development of semi-conductor technology has enabled enormous computing capacity in very small computing elements. As a result, microprocessors have found use within machinery as control elements, replacing cams and gears and relays and other such devices of the previous control technologies. As a result the flexibility of programmed microprocessors is now available in many types of equipment. With microprocessor control of machines so pervasive, there occurs the need that various types of equipment in a work process be tied together and report to various processors which can manage the overall operation. Management may occur at the process level, i.e., to send a work piece from one work station to another and perform the operations called for, and it can occur on an information level as well, i.e., for example, processes can acquire information about machines so that they can be maintained prior to a breakdown, processes can schedule jobs, maintain inventories and automatically perform other accounting functions.

The particular complex environment in which the current invention was developed is the large mail room operation. In such an operation a variety of documents must be printed, fed along conveyor lines for correlation with other documents to comprise the particular mailing, through devices which may trim the documents, fold them, place them in envelopes and place them on trays. The envelopes will have a printed address so that a weighing mechanism may determine the postage that is needed and place the postage on the envelope. There are machines to sort mail according to zip codes and by walk sequence, i.e., the sequence that a mail carrier will follow delivering mail along a particular route. Finally, the outputs may be boxed according to the location to which they are sent and delivery automatically ordered for the next airplane leaving for that location.

In the large mailroom, information about recipients might be included in a database. For example, certain mailings may go to those people who are known to enjoy golf and other mailings may go to people who are in the dental profession. Some mail room operators may wish to track the effectiveness of marketing promotions. For example, people in a certain area might be targeted to receive a discount on an item and coupons for those people would receive a certain bar code. Another area might receive a different discount and have a different bar code. Later, once the coupons are returned, data relating the amount of interest developed by the promotion can be accumulated by reading the bar codes and automatically producing the reports.

As may be observed from the above description the amount of data which is organized in large mail room operations is enormous. It is not unusual for these operations to include banks of computers, banks of data storage equipment, various types of printers from many different manufacturers and complex inserting equipment capable of merging documents from several paths into one stack, folding, cutting, inserting, franking, sorting, and packaging.

In the current environment marks may be placed on the paper in a certain location so that scanning those marks can trigger the correct operation to direct that particular paper along its route to its destination in the proper envelope. Such marks can be on each page of a document or they can be on header pages. Such marks might require the trimming of a document before it is actually sent out to a customer.

Figure 1:
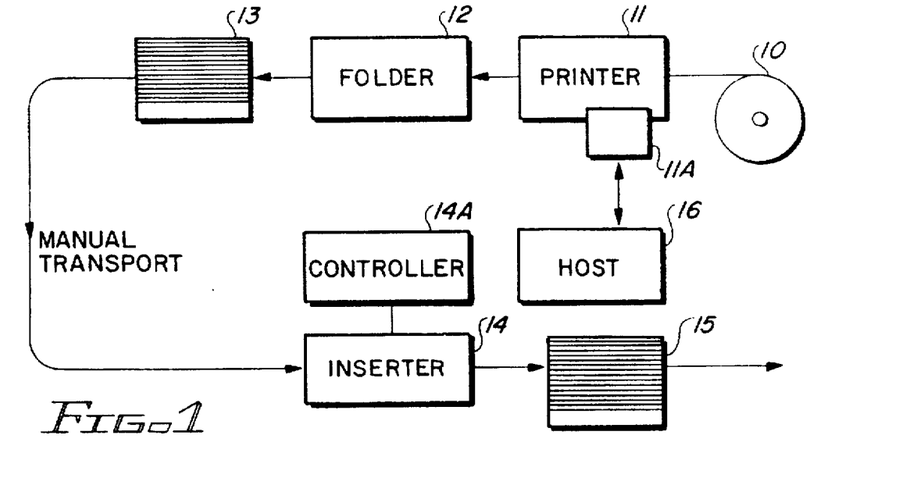
FIG. 1 shows a simplified configuration of a large mailroom system with a printer line for document preparation separate from an inserter line for accumulating documents in an envelope.

FIG. 1 shows a simplified configuration that is utilized at the current time in print mail room facilities. The print job originates with application processes on a host 16 which is typically a large mainframe computer, making use of database facilities attached to the host. The generated print stream is converted into a device specific data stream and sent to the controller 11A of printer 11 for production of documents. An unwinder mechanism 10 is used to unwind rolls of paper and feed the paper into the printer 11. The printer output is passed to a folding machine 12 and organized on trays 13. The tray 13 is moved manually to provide input to a second line of machinery which may include devices to cut and trim the stacks of paper into individual documents and feed the documents through an inserting machine 14. Inserting machines are complex devices under the control of a microprocessor based controller 14A. The inserter may also receive documents from other document feeding devices and envelopes from another printing source for inserting the proper group of documents into a properly addressed envelope. The envelope may then pass through a franking machine and through sorting apparatus before being placed on trays 15 from which the properly sorted mail is packaged and sent off to the Post Office. An important advantage of the configuration as shown in FIG. 1 is that the printer line is separated from the inserter line of machinery. As a consequence the problems of matching the speed of these two lines is eliminated and printers are not held up by the operations of the inserters or vice versa. Such a configuration also makes the printer available for non-mail jobs. One of the important disadvantages is that marks are needed on each document or at least on header papers to correctly move the job through the equipment and into the proper envelope.

Figure 2:
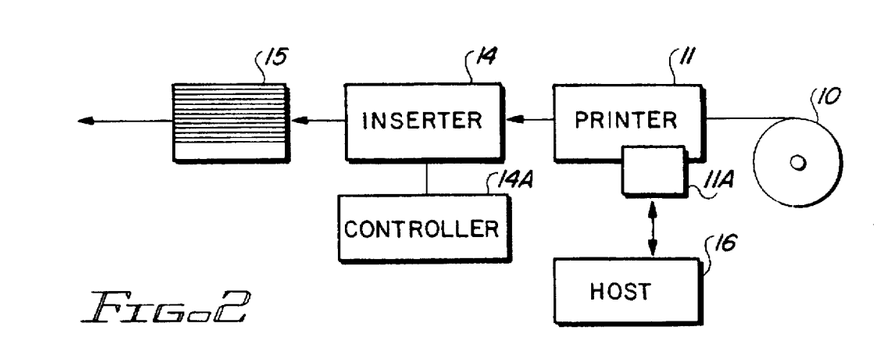
FIG. 2 shows a large mailroom system configuration with the printer line coupled directly to the equipment in the inserter line.

FIG. 2 shows a coupled configuration which is also in use at the current time. Again, the print job originates in the host 16 and in its large database and the print stream is sent to the controller 11A of printer 11. In this configuration an unwinder mechanism 10 unwinds a roll of paper for feeding to a printer 11, the output of which is directly coupled to the inserter line 14. The advantages of this type of configuration is that a folding machine 12 in the printer line is eliminated. only a single operator is needed and the output of the printer is packaged for immediate mailing. An important disadvantage is that the operations of the inserter and the printer must be speed matched. Also, in this configuration the printer is dedicated to mail applications and the system is only as reliable as its weakest link. Marks on the paper are still needed to coordinate the documents from a printer with envelopes fed into the inserter from a different document feeder.

Figure 3:
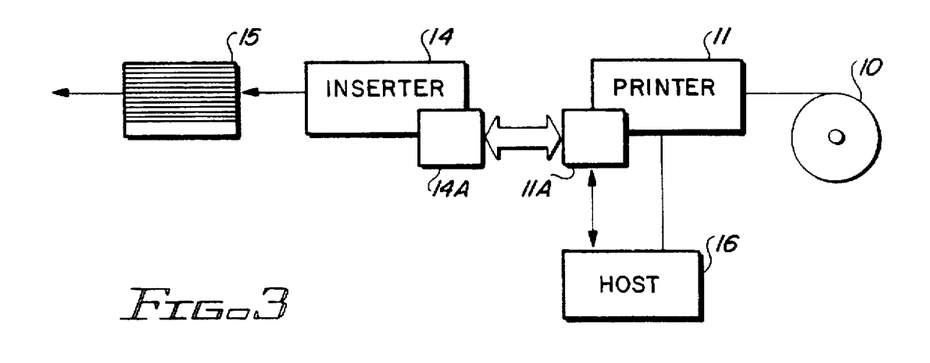
FIG. 3 illustrates a large mailroom system configuration wherein the controller of the printer is enabled to exchange information with the controller of the inserter.

FIG. 3 shows a system which may be termed an intelligently coupled configuration. This system is similar to the configuration shown in FIG. 2 except that the controller 11A for the printer and the controller 14A for the inserter are enabled to exchange information so that as documents are printed, the printer can inquire if the inserter is ready. If it is, then the printer can send the document on to the inserter. This system enables the printer to communicate with the host 16 that originates the print job and provide the host with information about the inserting equipment that is connected to the printer. As a consequence, the system is enabled to ascertain the capabilities present on the equipment in the print path. This system also enables processes running on the host to advise the printer and the other equipment in the path when a job begins and when a job ends so that the need for marks on the paper is diminished or completely eliminated. This system also provides an error recovery operation such that if a job is completed without incident that can be recorded. This system provides software control over the process but still retains certain disadvantages. For example, the speed between the printer and the inserter still must be matched. The entire line is only as reliable as its weakest link and the printer is dedicated to mail applications.

Figure 4:
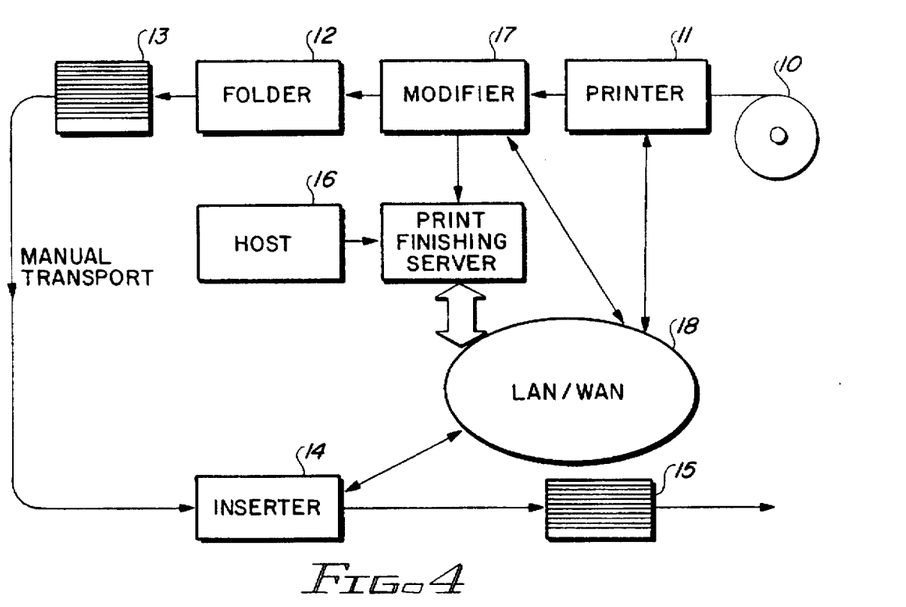
FIG. 4 shows a large mailroom system configuration wherein the output of the printer line is not directly coupled to the input of the inserter line, but the two lines are coupled over a network. The invention herein is designed for the network coupled configuration.

FIG. 4 shows a network coupled configuration for which this invention is designed. The print jobs originate with application processes at a host 16 for generating a print stream sent to the controller 11A of a printer 11 in much the same manner as the other configurations described above. In this system, FIG. 4 shows an unwinder mechanism 10 is used to unwind rolls of paper and send them to a printer 11. It should be noted that paper input to the printer could be from cut sheet document feeders, a continuous form feeder or any other type of paper feeder. The output of the printer 11 is sent to a medium modifier 17 which may be, for example, a mechanism to imprint a color plate on a medium, or make a perforation cut on a page to be returned by a recipient. From the medium modifier, the document path leads to a folder mechanism 12 for stacking the documents on a tray 13. In this configuration the printer line is separated from the inserter line. Consequently, there is a movement of the tray 13 to the input of the inserter line which is illustrated in FIG. 4 as a manual movement. In this configuration there is direct communication between the controller 14A in the inserter 14 with the system manager located on the network 18. Likewise, the system manager has direct communication with the controller 11A of printer 11 and perhaps with other devices in the system that have microprocessor based control. The communication may be either direct or through communication with the controller 11A in the printer or the controller 14A in the inserter. In that manner, error recovery procedures may be implemented throughout the system. The marks needed on paper are kept to a minimum. There still must be marks in order to identify jobs from the printer line when they reach the inserter. Speed matching is not a problem in this system since the printer line and the inserter line are separate and consequently the printer is available for non-mail jobs.

Figure 5:
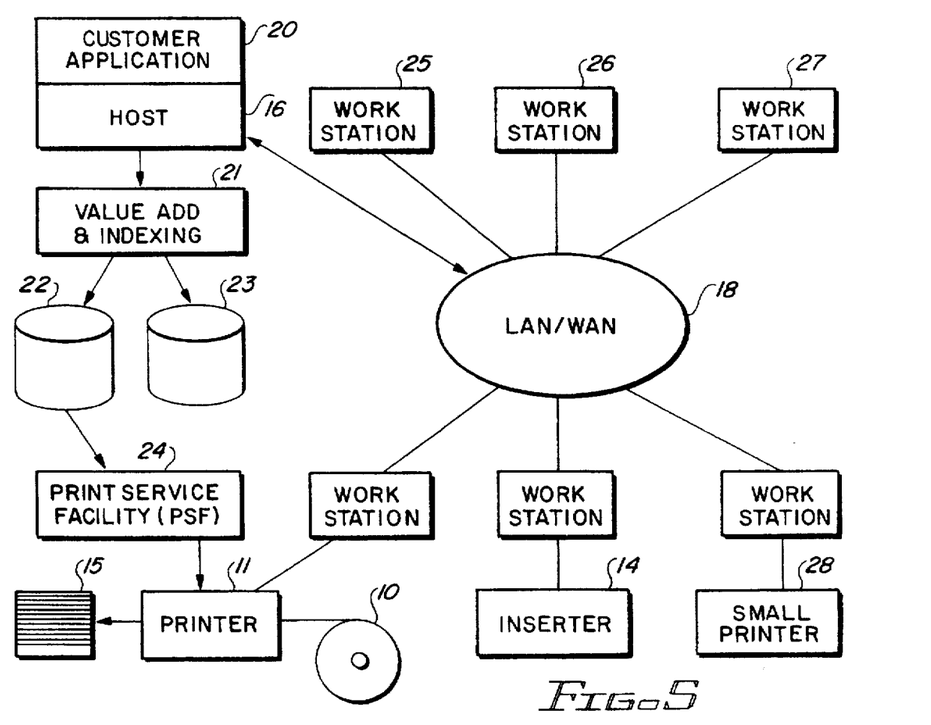
FIG. 5 shows a more complete depiction of the large mailroom network coupled system configuration of FIG. 4 and shows that a host or "mainframe" computer originating print jobs is coupled to the network together with many workstations which may be based upon desktop computers.

FIG. 5 is a more complete description of the system shown in FIG. 4 and shows that host 16 is connected into network 18. A customer application 20 is run on the host 16 to generate a print job. During that generation various value-add programs and indexing programs 21 may add to the print data stream and include data in the print files. Such programs may, for example, add bar codes for sorting files in zip sequence and generate the codes needed for proper finishing of the print job. Print files 22 and index files 23 may be created. Print Service Facility (PSF) 24 which also runs on host 16 will generate the print data stream for driving the printer 11. The system manager 25 resides on a work station which is connected into the network 18. The network may be either a local area network (LAN) or a wide area network (WAN). Also connected into the network are various work stations illustrated as graphical user interface (GUI) 26 and graphical user interface (GUI) 27 which may be placed in various locations for different purposes. For example, one may be at the inserter for the use of the operator of that line, one might be at the printer for the operator of that line, one might be at a warehouse for the warehouse manager to check the need for supplies as they are being used, e.g., paper, toner, etc.

In the system shown in FIG. 5, mutilated mail pieces are reprinted on demand on a smaller remote print station 28 attached to the network. In that manner, replacement documents are automatically generated as the system automatically senses the mutilation of a document.

Figure 6:
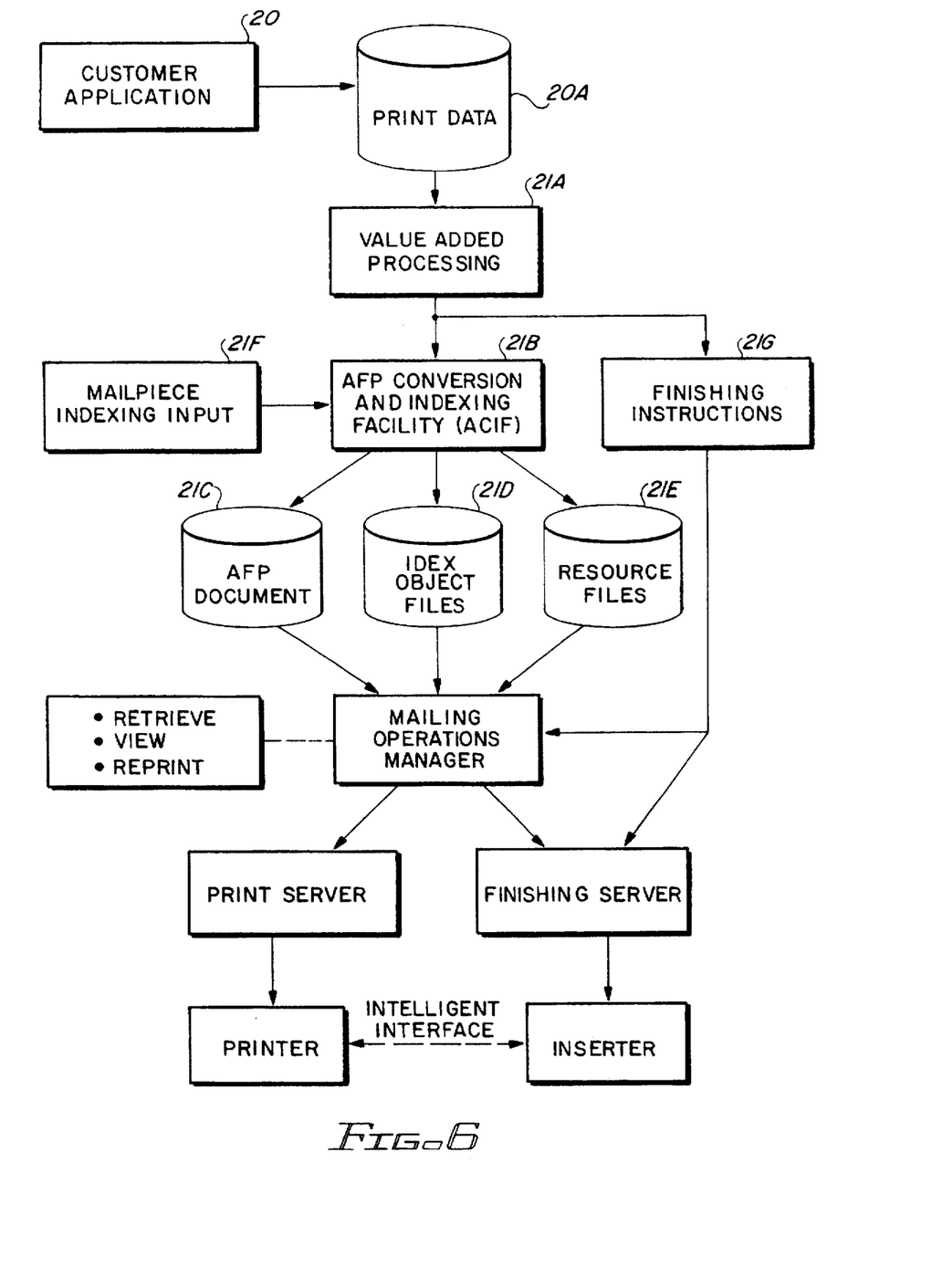
FIG. 6 shows an interface model of the system of FIG. 5 with many of the software and hardware components that must work together to automate the production of the individual mail pieces.

FIG. 6 shows a generic interface model for the large mail room system of FIG. 5. Such a system is a coordinated set of hardware and software components and interfaces that work together to automate the output processes associated with high volume printing, finishing and delivery of individual mail pieces. Work begins in the data processing portion of the system with applications 20 that generate print data 20A. In many instances these applications are existing "legacy" applications on large mainframes that produce many types of large mailings such as, for example, the billing statements of utilities for customers. As shown in FIG. 6 the print data 20A from customer applications is further processed by value-add applications 21A and advanced function presentation (AFP) functions 21B that condition the data for printing and prepare object files 21C, D, and E for downstream operations.

In today's modern environment there are many tools available to assist in generating customized print output. Examples of value-add functions are programs which provide address verification, presorting of statements by their postal characteristics, programs 21G for building insertion instructions based on information contained in demographic and marketing databases and programs 21F for segmenting print data into manageable units of work.

Examples of advanced function presentation functions are services that convert line data into page data, build document index objects for locating individual groups of pages and building print files for reprint, viewing and archiving services for storing and retrieving the manageable printing units of work.

Host value-add programs and AFP services are designed to be application independent so that they do not require changes in the customer's print producing applications in order to perform their function. Once the VA and AFP process is complete the print files are scheduled for printing. Control information for the insertion process is separately sent to the finishing server when the finishing hardware is not in line in the print path. Bar code or optical recognition marks on the paper are used by the finishing server to correlate the finishing instructions for a print job with individual mail pieces to be assembled and packaged for postal delivery.

Figures 7, 8:
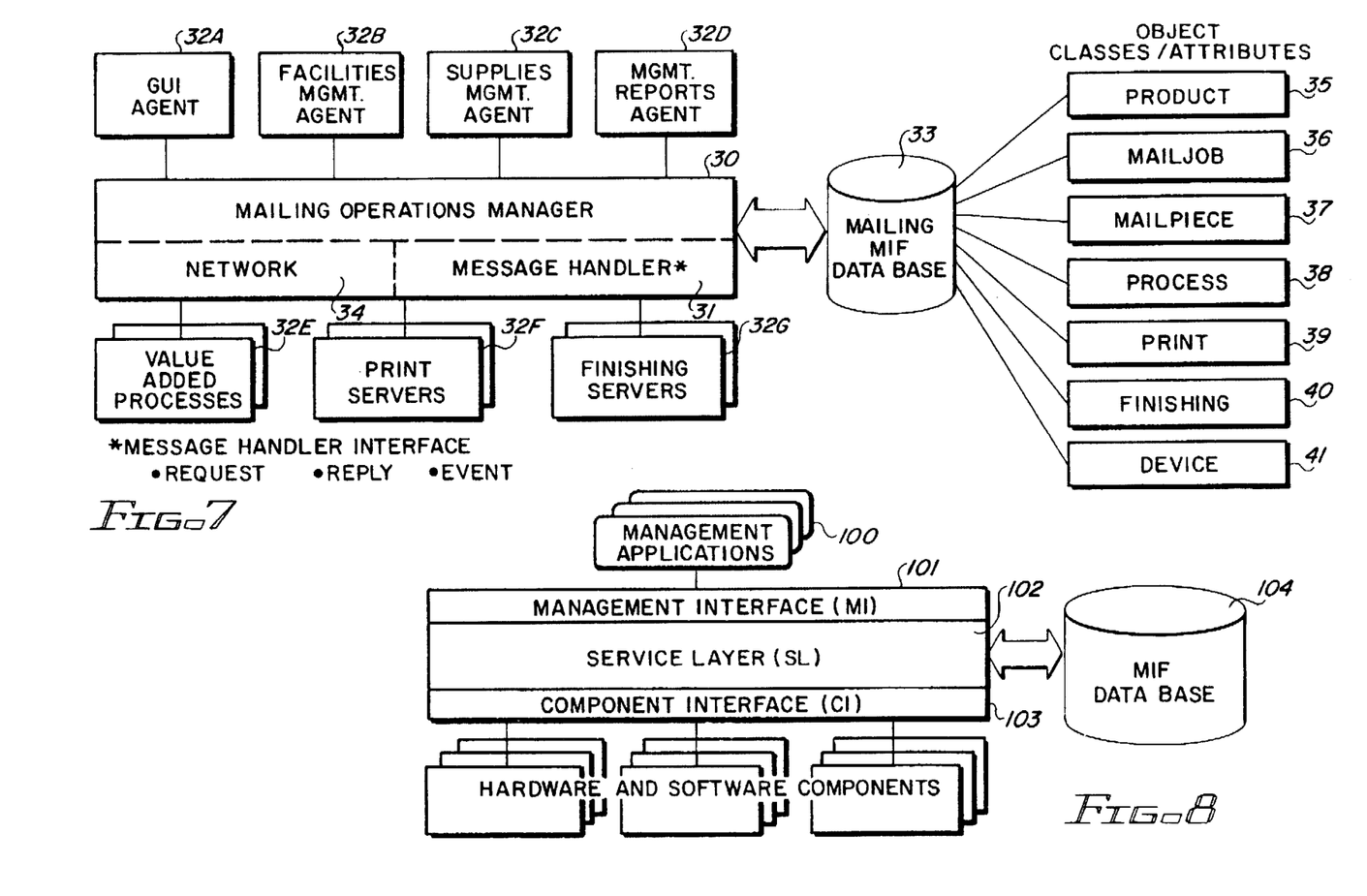
FIG. 7 shows a model of the mailing operations manager developed to control the large mail room operation by providing an object-oriented database into which all of the various hardware and software components can define themselves and report changes in status.
FIG. 8 shows a model of the "Desktop Management Interface" (DMI) developed to manage the hardware and software components of a desktop computer, regardless of variations in operating system software, application software or hardware components comprising the desktop computing system. The desktop model of FIG. 8 is extended, herein to describe the network model of FIG. 7.

FIG. 7 shows a generic model of the system manager, mailing operations manager 30, which must provide a message handler interface 31 that is used by all of the various hardware and software processors 32A-G to define themselves to the system and report changes in status. Information about the processors 32A-G is maintained by the systems manager in a database called the Management Information Format (MIF) file 33. The system manager must also provide the request, reply, message interface 31 used by application agents to query status and obtain information about the products, mailing jobs and mailing pieces in progress over a network 34 providing client/server functions.

The system and models shown in FIGS. 5, 6 and 7 were developed by a council of users and vendors called LMO Systems Workgroup. That workgroup, comprised of research companies, is now known as the Data Management Task Force (DMTF) Finisher Workgroup, and was formed to identify key requirements of large mail room operations (LMO) and to explore the possibility of defining an open systems architecture standard for meeting them. This work resulted in demonstrating the capabilities of an integrated system at the "XPLOR" conference in November of 1993. The "Large Mailing Operations Standards Specification", Version 1.0, incorporated herein by reference, was published on Oct. 31, 1994, by the DMTF Finisher Workgroup and is available from Pennant Systems, Inc., Boulder, Colo. 80301-9191. It is the standard that has been developed by the workgroup to manage hardware and software processors in the large mail room operations systems environment.

The demand for standards is fostered by the need for selecting an architecture base that is widely accepted, easy to implement and extendable to future requirements. Customers and vendors alike need to feel that their solutions and products are built on interfaces that are durable and can take advantage of emerging technologies. In the desired system, easy to understand graphical interfaces commonly used on desktop computers are important.

In looking for currently available open systems standards for modeling the functions required in the large mail room operations (LMO) environment, the LMO standards work group discovered that the standard base that most closely meets these requirements is the DeskTop Management Interface (DMI). The DMI standard is managed by a group of companies calling themselves the DeskTop Management Taskforce (DMTF) who published the DeskTop Management Interface Specification, Version 1.0 on Apr. 29, 1994, incorporated herein by reference. The publication may be obtained from any company who is a member of the taskforce including IBM Corporation, P.O. Box 1900, Boulder, Colo. 80301-9191.

Implementations of the DMI are available today or committed in OS2, Workplace OS, DOS and AIX. Other platforms are sure to follow. By building LMO objects and management protocols on the DMI, LMO standards may be established in a uniform manner across all of these platforms.

In the terminology of DMI, components are physical or logical entities on a system such as hardware, software or firmware. Components may come with the system or may be added to it. The code that carries out management actions for a particular component is known as "Component Instrumentation". FIG. 8 shows a generic model of the DMI.

A management application 100 is a program that initiates management requests. A management application uses the DeskTop Management Interface to perform management operations. The management application is exemplified by a program such as an application with a graphical user interface (GUI), an application program agent, or it may be a network management protocol agent that translates requests from a standard network management protocol such as SNMP or CMIP to the DMI and back again.

The service layer 102 coordinates access to component instrumentation and component provided data in the Management Information Format (MIF) database 104.

One may note the natural relationship of the DMI model shown in FIG. 8 with the LMO model shown in FIG. 7.

In the use of the DMI, component descriptions are defined in a language called the "Management Information Format" (MIF). Each component has an MIF file to describe its manageable characteristics. When a component is initially installed into the system, the MIF file for that component is added to the MIF database 104 for use by the service layer.

The component interface (CI) 103 is used by component vendors to describe access to management information and to enable a component to be managed. The CI shields vendors from the complexity of encoding styles and management registration information. Vendors do not need to learn the details of emerging management protocols.

The management interface (MI) 101 is used by applications that wish to manage components. The MI shields management application vendors from understanding the different mechanisms used to obtain management information from elements within the system.

The CI and MI are data interfaces as opposed to procedural interfaces. Data blocks are used as the format for data transfer—not parameters to a function call. The behavioral mechanics of the CI and MI make up the data transfer mechanism.

The service layer (SL) 102 is an active, resident piece of code running on a computer system that mediates between the MI and the CI and provides access to the database 104.

It should be noted that the DeskTop Management Task Force which developed the DMI did so to close the gap between management software and the system components that require management on a desktop computer. Within a computer system, the DMI has been designed to be independent of any specific computer or operating system. It is designed to be independent of any specific management protocol. It is designed to be independent of a network but it is designed to be mappable to existing management protocols, e.g., CMIP or SNMP. Basically, however, the DMI is designed for a single desktop computer where components are physical or logical entities on the computer system, such as disk drives and word processors. The DMI does not address or specify a protocol for management over a network but the prospect of managing several desktop computers within a network was considered by the DeskTop Management Task Force. The LMO standards work group has greatly extended the vision of the DMI by applying it to a network which not only includes desktop computers, but also includes complex machinery, such as document finishers and inserters. Moreover, the vision of the DMI is extended to include large mainframe host equipment and processes running thereon. The LMO system calls for defining the manageable characteristics of complex machinery and the manageable characteristics of mainframes and mainframe processes in an MIF database so that these characteristics can be managed from a workstation or desktop computer or any GUI on the network.

SUMMARY OF THE RELATED INVENTIONS

In implementing the large mail room system manager model on the DMI interface several problems were revealed which resulted in the inventions which are the subject of this patent application and the related patent applications named above.

A problem faced in implementing the system manager models involved the many legacy applications running on mainframe platforms to prepare print jobs. In a large mail room operation there are many applications and value-add processes running on mainframe computers that need to be tracked and managed as an integral part of the mailing operation. Examples of these are programs which generate print output, like bills for mailing; programs which pre-sort customers' statements by postal characteristics; value-add processes that add bar code data to print images and build finishing instructions for individual mail pieces; and programs that further condition data objects for archiving, printing and insertion process steps in the workflow path of mailing. In many instances, these applications are not capable of generating direct calls to set values and report status in the DMI databases so that they can be managed using the standard management interfaces defined by the DMI. Related patent application Ser. No. 08/334,584 provides a solution to this problem. Because the characteristics of host programming can vary from one host system to another, it was determined that a data stream solution would be preferred to a procedure based program call solution. In the invention, agent programs to set control parameters in the DMI database for use by management applications are provided, so that tags inserted in the data stream can be fielded by the agent programs and converted into the proper format for setting control parameters in the DMI database. The basic building block of the invention is a self-defining "Tag Logical Element" (TLE) structured field which was already available in the Advanced Function Printing architecture. The TLE structured field in turn is comprised of two self-defining fields called triplets. One triplet identifies the TLE as a tag for setting DMI values. The other triplet contains the parameters used in setting specific attribute values in the DMI database. An instrumented agent is provided as an exit program in the host to split away the TLEs and send them to an agent program in the DMI server to interpret the tags and generate the DMI commands. The tags may be placed in the print stream by the applications themselves or by value-added processes at the host. Once the invention had been generated for application programs at the host, it became apparent that any program which generates TLE tags could submit those tags directly to the program agent in the DMI server and establish values in the MIF without needing to utilize C-language programming to interface with the MI. In this manner, management applications at any node in the system, not just a host, can utilize the simple TLE mechanism to set attribute values.

A problem addressed by the inventors relates to the need for various management applications at various nodes to access the same data in the database for different functions in different report formats for different purposes. For example, a supply low event attribute may require the attention of a machine operator on one node. It may trigger an inventory transaction at a second node and it may cause rescheduling of mail jobs to match work with available supplies from a third node. Each of these functions and others may be performed by different users at different nodes in the LMO installation. Object-oriented modeling of the large mail room environment enables large volumes of attribute data associated with each step in the mailing process to be captured and maintained in the database. Attributes about products, mail jobs, insert jobs, printers, inserters, supplies, machine set-ups and finishing instructions may all be found in the object model of the various components of the system. The problem of accessing all of that data in various ways is compounded by the need to allow the object database to grow over time and report formats to change without requiring reprogramming to access new functions. Another difficult requirement is to allow customization of reports on an attribute by attribute basis for different users of the system. Related patent application Ser. No. 08/334,810 provides a solution to this problem. To meet these requirements a table-driven technique has been invented that recognizes the generic structure of components, groups and attributes in any MIF file and defines the mapping of any attribute value in any component to any column in any window on the display in any order. The mapping of a specific collection of attributes to a particular window is called a report. Multiple reports may be associated with a particular user who is authorized to view and interact with the data to accomplish a task in the LMO system. The report definitions supported by this invention enable each attribute in a report to be controlled or monitored individually. The control functions provided include the ability to add additional controls as they become required and is provided for by the report definition structure.

A problem confronting the inventors was to find an answer to common workflow-related questions, such as, where is a particular mail piece? In a large workflow-oriented system environment, like the environment for large mail room operations, there are a number of process steps that must be performed on a named unit of work, such as a mail piece, to answer such a query. Each process step is a manageable component with its own characteristics, its own processing states and a status that may be modeled and managed in the LMO system. Object-oriented models of mail jobs are best represented by tables of transactions for each of the many hardware and software process steps required in the mailing. Since a single mailing may have upwards of one million mail pieces, and a given LMO system may have multiple mailings active at the same time, rapid access in update of transaction entries in these tables is both a requirement and a challenge. Existing table management protocols in object-oriented environments, such as SNMP and CMIP, are not adequate to meet the volume and performance requirements of an LMO system. Database systems on the other hand, provide efficient query and reply access to large databases, but fail to provide modeling and reuse capabilities required in LMO systems. The invention described in related patent application Ser. No. 08/334,592 solves this problem. It provides instrumentation logic to efficiently develop all of the many DMI commands that are necessary to answer a management query such as "Where is the mail piece?" The invention shields the user from the need to understand the details of the MIF file and develop himself all of the necessary commands to obtain the data. The invention has also been carried further in that speed in answering the query is improved by providing instrumentation logic to map object-oriented protocols to efficient data management protocols to provide direct keyed access to mail job data located in a specially created database utilizing available database products such as DB2. The novel techniques herein provide instrumenting groups that are used for passing parameters and returning values for complex queries while using the standard facilities of existing management protocols. An example of the usefulness of the invention in the LMO environment is, for example, to track mail piece data. To do that, a group may be defined with attributes that are set to specify the mail piece and mail job identifiers. These attributes are input arguments for the search. After setting the search attributes, the management application issues a DMI "GET" command for the current value of the location of the attribute of the group. The DMI service layer responds by invoking the inventive instrumentation for the tracking component. The instrumented code issues all necessary commands to query each active process, locate the mail piece and return the location value. The instrumented code itself is a management application that uses the standard DMI interface. In other object management environments, such as SNMP, access may be provided through agent programs. The selection of the underlying database manager may vary from implementation to implementation and is transparent to the management application requesting the access.

SUMMARY OF THE INVENTION

In a large mail room operation there are many hardware and software processes to be managed and many management applications requiring access and control over the manageable data. Most of these processes and management applications are located on, or controlled by computing systems other than the particular computing system containing the DMI and the MIF database. To satisfy the networking requirements of the large mail room operation, the DMI model needed to be extended to provide for client/server communication in a manner that preserved the syntax and semantics of the DMI standard, while enabling the service layer to continue to dynamically coordinate and arbitrate requests from the management applications to the specified component instrumentations. This invention provides a solution to this problem. It was observed that because the nature of the service layer is to provide support that handles run time management of both the management interface and the component interface, simple request/reply, client/server protocols would not suffice. To solve this problem has required the invention of a network client protocol capable of handling three-way dialogues between clients, servers and instrumented components all residing on different nodes. To do that the client interface was established by supporting all of the functions of the MI and the CI at each of the required client platforms. This is accomplished by porting DMI function calls to those platforms and implementing them on a "Remote Procedure Call" (RPC) base using Transmission Control Protocol/Internet Protocol (TCP/IP) as the transport carrier. The underlying RPC support is handled by the client interface code and is transparent to the DMI programmer. The invention enables operation in a consistent manner across a variety of operating systems, hardware platforms and different architectures. In addition, it is capable of allowing a client implemented on one architecture to interoperate with a server implemented on another. The invention preserves the semantics and syntax of the MI and CI, while enabling data transfer mechanisms to and from client, servers and instrumented components, all of which may reside in different nodes in the network.

BRIEF DESCRIPTION OF THE DRAWING

The invention is set forth in detail below with reference to the accompanying drawing a brief description of which follows.

DETAILED DESCRIPTION OF THE INVENTION

When reference is made to the drawing, like numerals indicate like parts and structural features in the various figures.

FIG. 7 is a model of the systems manager and shows various objects for the object-oriented database 33 which have been defined by the LMO standards work group. These are various object classes which were considered important in managing the large mail room operation. Object class 35 is the product object which describes the name and the attributes of a mailing, for example, a product may be a mailing of bills. The mail job object class 36 is an object which identifies a manageable segment of the total product. For example, a mail job may be two thousand accounts within the total billing product.

The next object class is the mail piece object 37 which describes a specific set of pages that go into a particular envelope, for example, that set of pages that go into making up one particular bill to one particular customer.

The process object 38 contains a description of the steps that a mail piece must go through for it to be created, printed and mailed.

The print object class 39 will include data files for the various devices in the system that put marks on paper, for example, an IBM 3900 printer.

The finishing object 40 contains MIF database objects which describe the attributes of those devices that do the processing on the finishing line. For example, the manageable attributes of an inserter machine or a sorter or a document feeder or a franking machine would be the type of object found under this object class.

The device object class 41 is for other equipment which may be used in one of the processes interacting on the mail piece. For example, this object class would include a database on color imprinters.

Also in FIG. 7 various so-called agent programs 32A-32D are illustrated. A facilities management agent 32B is a program that would be developed by the owner of a mail room operation to manage the particular facilities included within that operation. The supplies management agent 32C is a program which would be developed and supplied by the owner of the large mail room operation to implement the management of supplies needed within that operation, for example, postage, toner for printing machines, paper, etc. The management reports agent 32D reflects those various programs which would be developed by the owner of a large mail room operation to obtain the particular type of management information that is needed from the database 33. For example, a management report agent might be developed to obtain information relating to the scheduling of mail jobs within the entire operation, so that for example, if one printer line is down, the mail job may be scheduled into the workflow for another printer line. In addition to these agents, other agents may be developed for a particular installation. All of these agents may operate from the same node or from different nodes on the network but it is envisioned that each of these agents will be located in the most advantageous location within the operation. All desktop computers will be provided with the GUI agent 32A to establish the interface for all other agents to the mailing operations manager 30. The GUI agent is not supplied by the owner of the large mail room operation, but rather is supplied with the systems manager to provide a generalized interface for all GUI nodes.

In implementing the DMI standards, management information files (MIF) must be created in adherence with the DMI format. Files created in that format describe components which have attributes that have values and whose attributes can be assembled into groups.

A DMI component is any hardware or software device that can be connected to a computer system. In the LMO environment, this definition is extended to include such things as printers, inserters, status collectors, and various pre- and post-processing mechanisms.

An attribute is a characteristic or function or feature of a device, specifically a relevant and manageable characteristic. An attribute is a feature or function that a device manufacturer defines for expressing data values about the attribute. Applications systems used to monitor and control the device utilize attributes to manage it. An example of an attribute is the supplies that a printer uses.

A group is a "group of attributes". Attributes are assembled into groups based on their similarity of function or purpose. Examples of groups include such things as the input characteristics of printers or their output characteristics.

Attributes of devices have values attached to them. Some of these values are static values such as the name of the manufacturer of a printer, while other values are dynamic such as the number of pages that a printer has printed since it was installed.

MIF files are files describing components and their attributes. Each device manufacturer provides an MIF file that describes the characteristics of the device that can be managed. The MIF file is installed into the database of the system. The device makes itself known to the system through the MIF database.

Note that the system manager expands the DMI concept of a "component" to include not only hardware and software devices but also mail jobs and mail pieces in products being handled in the large mail room environment. Utilizing files developed in the MIF format, the system manager provides an interface to handle messages from devices to computer systems to create and update files about mail jobs and mail pieces. The system manager also provides interfaces so that users can query device status and obtain information about the various products, mailing jobs and mail pieces flowing through the system.

A third set of standards with which the system manager is compliant is the Advanced Function Print Data Stream (AFPDS) standard. This standard is described in "Mixed Object Document Content Architecture Reference," Document Number SC31-6802-02, Third Edition, June 1993, IBM Corporation, Department 588, P.O. Box 1900, Boulder, Colo. 80301-9191, U.S.A., and is incorporated herein by reference. This standard includes a data stream format that supports graphics, text, barcode and resources such as fonts, overlays, page segments, form definitions and page definitions. The reference describes data stream tagging, page 140 et seq. As more fully described in related patent application Ser. No. 08/334,584, data stream tagging is used to identify individual mail pieces and to track them through the printing and inserting process. Tagging product data streams allows a break up of a data file into logical documents, each identifying a particular mail piece or recipient. Such tagging allows not only the tracking of mail pieces through the printing and inserting process, but also allows logical documents like mail pieces to be retrieved, viewed and archived.

In creating the system, it is important that devices of all kinds from different vendors should be able to be connected to the mailing system without requiring modifications. In addition, the system must be extensible, that is, it should be possible to add services, commands and actions without requiring redesign of the system. Also, the system should be based on a client/server model to take advantage of the versatility afforded by networks. The system should use graphical user interface technology. An additional requirement of the system is that it should be portable across different operating systems and types of computing machines. Finally, the system should be configurable, that is, users should be able to tailor the data in the system to their own management requirements. The LMO systems work group has provided a standard to meet all of these requirements.

Each component, which may be a device or mail job that is added to or installed in the system, must have an accompanying management information format (MIF) file to describe the manageable aspects of the component. By adding the MIF file to the database, the component is made known to the system and thereby is made available for responding to management commands. Vendors of devices who wish to be compliant with the DMI format must supply MIF files for their devices and installation programs to present the MIF file to the database through the service layer.

In the database, attributes may be a single valued entry or they may be group attributes defining a table or array of related attributes and their values. An example of a group attribute that defines a table is "printer supplies". Since there may be several different supply types such as paper, toner, fuser oil, etc., each with different attribute values, the attribute "printer supply" points to a table or array of supply types and their attributes, rather than to a single value. Whenever the various attributes in a group define one or more rows in a table, a key is needed to define the attribute IDs that are used as indices to the table. By use of the key, the particular row and attribute in the table is found.

The DMI recognizes that some attributes represent static information, for example, the name of a vendor, and also include dynamic information, for example, the amount of paper on the unwinding machine. To obtain static information the request for an attribute value is fielded by the service layer and reference is made to the MIF database to answer the query. The same approach may be used for dynamic values. However, the database attribute value may not have been updated for some time. To obtain current values of dynamically changing attributes, the DMI makes available the "component instrumentation" code for acquiring the attribute value from its source. When component instrumentation is used, the service layer branches to the component instrumentation to obtain the latest value for that attribute.

The description of each component in the MIF database is established according to a standard definition and utilizes clear text. The definition is of a component with groups and the attributes of those groups. The MIF format provides a keyable data structure. Once the description is in the system, the service layer enables the traversing of these different objects to monitor the values of the attributes in order to provide the data from which reports can be generated. A clear text file is one in which there is no particular formatting other than perhaps a delimiter, such as carriage return. Consequently, it is easily keyable information which may be described in any human language, English, German or whatever and translated into an ASCII database for use by the computer.

The management interface (MI) interfaces with the management applications to provide access to the data base for management functions. The command "DMIGET" would be used primarily by the management applications to request information through the service layer for a particular component. The service layer acknowledges receipt of the message and issues as many requests to different component instrumentations as necessary to satisfy the management request. If the initial request was for static information, the service layer would find that information in the database. If however, the request was for the current state of a device, the service layer would act as a mediator between the requester and the component and would address component instrumentation through the component interface (CI) to obtain the current status of the device. Once ascertained, the current state would be passed on to the management requestor through the management interface. The command "DMISET" might be used by the hardware and software components through the component interface (CI) or by management applications through the MI to set information in the data field. All of the DMI commands and the control blocks for those commands are set out in the DMI specification which has been incorporated herein by reference.

The desktop management interface (DMI) was designed to operate in a stand-alone system. The complex process to be managed in a large mailroom however, requires a networked system with several nodes. In order to extend the DMI architecture to a networked system, the invention herein provides a server at the DMI node to interface with the DMI in the same manner that a management application would interface with the DMI on a stand-alone system. The server also interfaces with the DMI in the same manner that a component would on a stand-alone system. The server is designed to act as a proxy management application and as a proxy component. The server also connects into a local area network or wide area network, to which are attached to several other nodes.

It is desired to retain the DMI interface for management applications at remote nodes in a manner that is transparent to the management application. That is, the management application running at the remote node issues exactly the same commands as it would if it were at the DMI node. Similarly, it is desired to retain the DMI interface characteristics at remote components, so that they issue the same DMI commands that they would if they were on the DMI node. The invention enables the preservation of the DMI interface in all respects and requires only the addition of a DMI "CONNECT" command to be issued at the beginning of a session and a DMI "DISCONNECT" command at the end of the session. One further command is the DMI "MANAGEMENT" command, which deals with byte order. It is necessary to convert byte order where Intel Corporation microprocessors are at one node and non-Intel Corporation microprocessors are at a different node.

Figure 9:
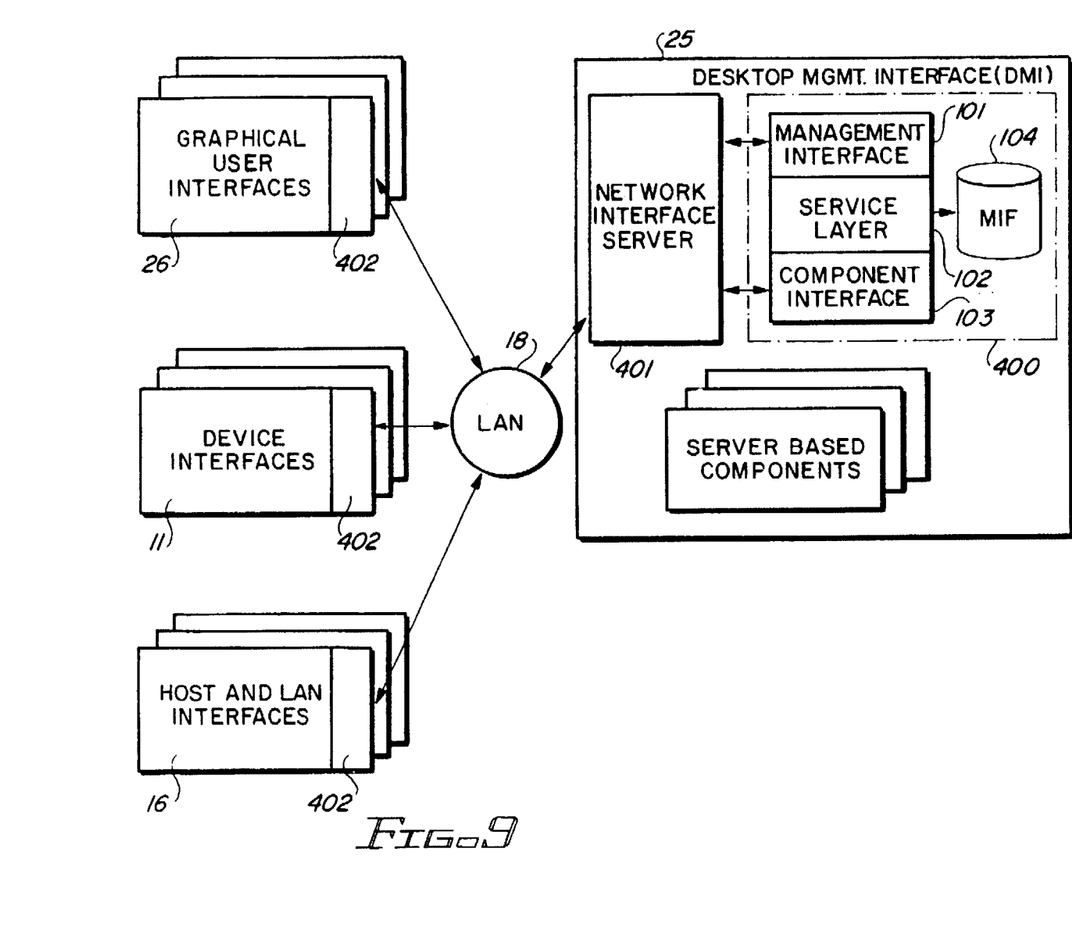
FIG. 9 shows the inventive system wherein a network server is resident at a DMI node to interface with the DMI and all other nodes on the network and including client agents to interface with the applications or components at those nodes and with the network server at the DMI node.

FIG. 9 illustrates the organization of the system. The desktop management interface 400 is located on node 25. DMI 400 includes a management interface 101, a service layer 102, and a component interface 103. A management information format file 104 is also located at node 25 for storing the various objects defined for the system. To extend the DMI to a networked arrangement, a network interface server 401 is included at node 25 to act as a proxy management application and/or proxy component. Various graphical user interfaces such as node 26 may be connected into the LAN 18. Various device interfaces such as an interface for a printer 11 may be connected into the LAN and host interfaces such as a mainframe 16 can also be connected into the LAN. At each of these nodes 26, 11 and 16, a management client server code 402 is resident to interface with the management application, for example, in the same manner that the management interface 101 would interact with the management application were that management application at the node 25. The client server code 402 resides at all client nodes whether they be management applications or components. The client code 402 invokes a remote procedure call (RPC) in the DMI server 401 to generate the appropriate command for the service layer.

To operate in asynchronous fashion the client code 402 contains a call-back server to answer RPC calls made by the DMI server 401 to the call-back server to return data and/or status.

Structure of the component client server code at a component node is the same as for a management client server at a management node.

Figure 10:
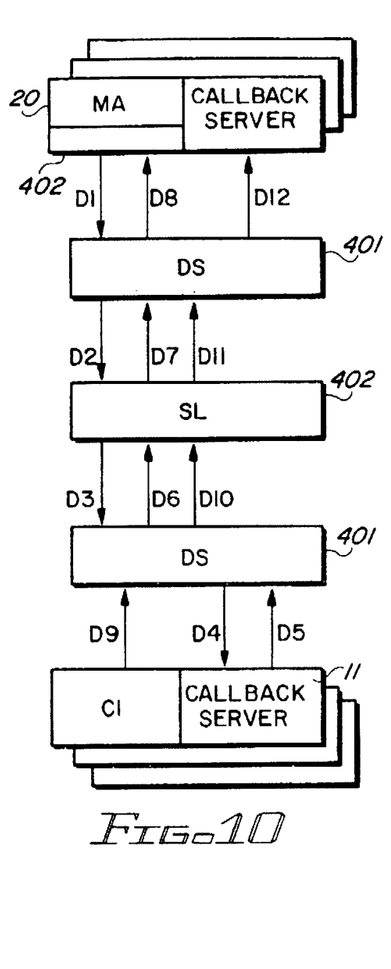
FIG. 10 illustrates data flow in the system of FIG. 9.

FIG. 10 illustrates the data flow in the system shown in FIG. 9. A management application 20 issues a request to the service layer. The client server software 402 fields the request and creates a buffer containing the DMI command and invokes the appropriate Remote Procedure Call (RPC) on the server 401. Data is transferred via the network and byte order is converted if necessary, data flow D1.

The network server 401 modifies the command to reflect its entry point and issues the modified command to the service layer, data flow D2. The service layer 102 responds to the command and in the flow diagram shown in FIG. 10 sends the request to a component. The component might be a registered DMI client component instrumentation. In that event the network server 401, acting as a proxy component instrumentation, is called, data flow D3. The server processes the command and invokes an RPC in the component's call-back server, data flow D4.

The component 11 responds to the request and returns from the RPC, data flow D5. Server 401 receives the component data and passes it along as a proxy component instrumentation to the service layer 102, data flow D6. The service layer then returns to the server 401, acting as a proxy for the management application, data flow D7, and the server 401 responds to the management application 20, data flow D8.

FIG. 10 also illustrates a data flow for event notification. In this instance the component instrumentation posts an event to the service layer, data flow D9. To do this the client code 402 at the component fills a buffer to send the event and invokes the appropriate RPC on the DMI server 401. The server receives the data and makes the appropriate DMI INDICATE call to the service layer 102, data flow D10. The service layer then posts the event to the proxy management application, that is, the server 401, data flow D11. Finally, the server 401 responds to the appropriate management application by making an RPC call to the management application's call-back server, data flow D12.

Figures 11, 12:
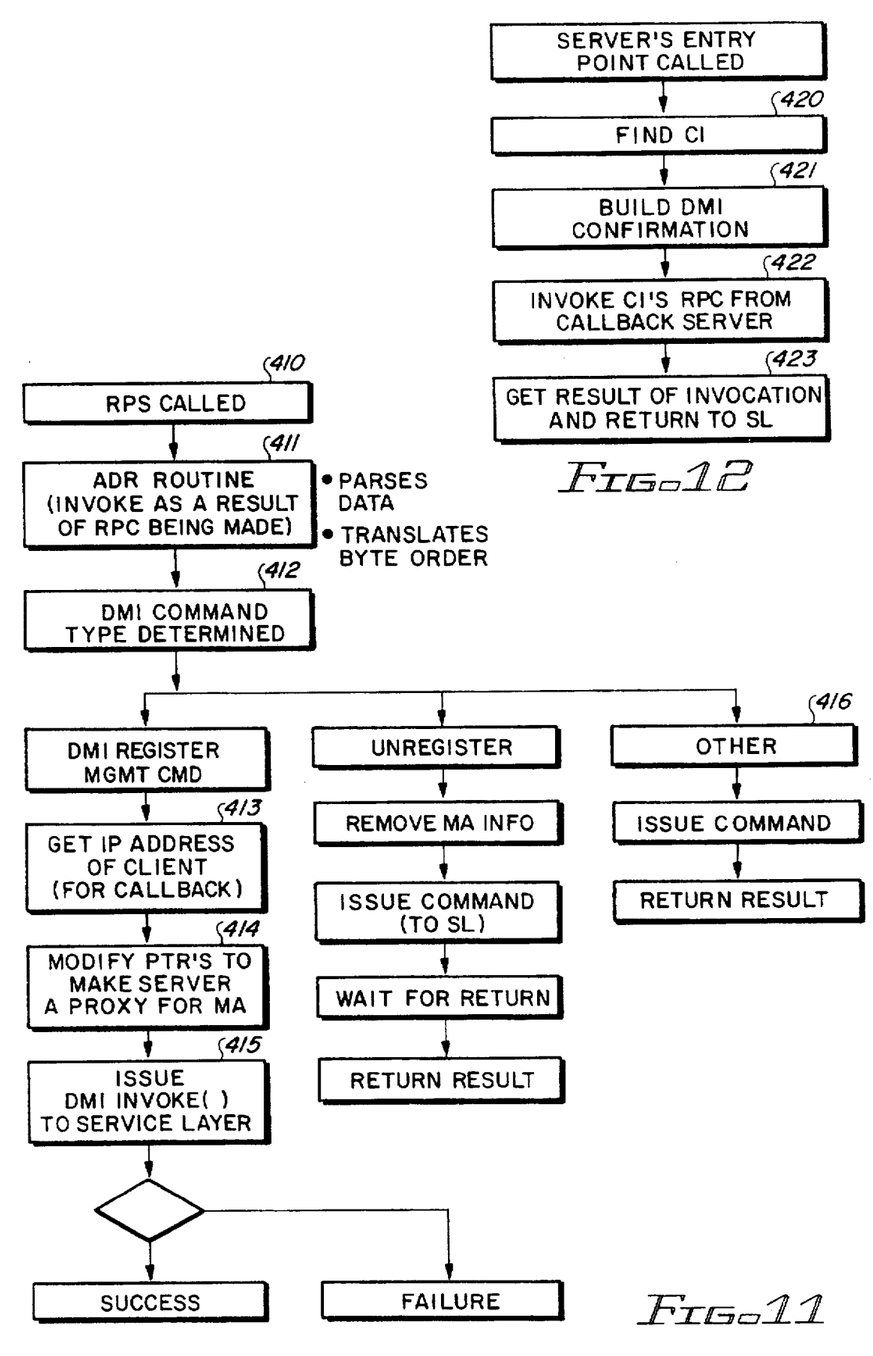
FIG. 11 shows the processing steps performed by the network server to present management application requests to the DMI.
FIG. 12 shows the processing steps performed by the network server to access component instrumentation.

FIG. 11 illustrates the processing done at the server 401 when a management application requests that a service layer command be invoked. An RPC call is received at step 410 and the data is parsed and the byte order translated at step 411. The DMI command type is determined at step 412 and depending on the particular command, the management application will be registered with the service layer, unregistered, or some other DMI command such as a "GET" or a "SET" will be issued. If a registered command is being processed, the network address of the client is stored at step 413. Pointers are modified at step 414 to make the server a proxy for the management application and at step 415 a DMI "INVOKE" command is issued to the service layer. If a "SET" or "GET" command had been issued at step 416, the command would be sent to the service layer and a result returned. If the server is acting in an asynchronous fashion an indication of success or failure would be returned.

FIG. 12 shows the processing steps for accessing component instrumentation by the server 401. When the service layer calls the server 401, the server finds the appropriate component instrumentation at step 420 and to operate asynchronously, builds a DMI confirmation buffer 421, invokes the component instrumentation's RPC at step 422 and receives the results of the invocation at step 423. Return is then made to the service layer.

Figure 13:
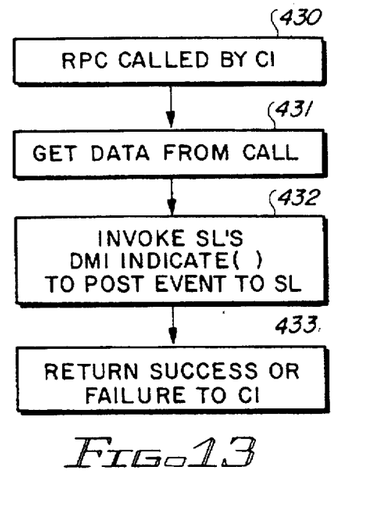
FIG. 13 shows the steps performed by component instrumentation to register an event to the server.

For event notification by instrumentation, FIG. 13 illustrates that a Remote Procedure Call is generated by the component instrumentation through client server 402 at step 430. The network server receives data from the call at step 431 and invokes the service layer to post the event at step 432. The service layer then returns an indication of success or failure to the component instrumentation at step 433.

Figure 14:
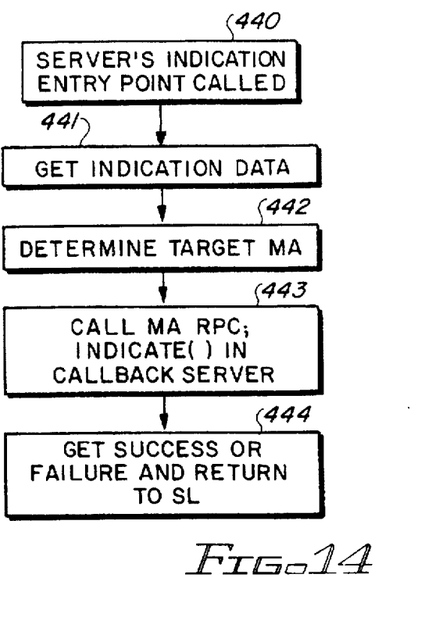
FIG. 14 illustrates server processing in posting an event.

FIG. 14 illustrates the server functions for the posting of the event. Here the service layer calls the network server 401 which is acting as a proxy management application at step 440. The server then gets the data at step 441, determines the target management application at step 442 and issues an RPC call at step 443. If the transmission resulted in a success, that is indicated at step 444 and a return is made of the indication to the service layer. Similarly a failure in the transmission would also be returned to the service layer.

Figure 15:
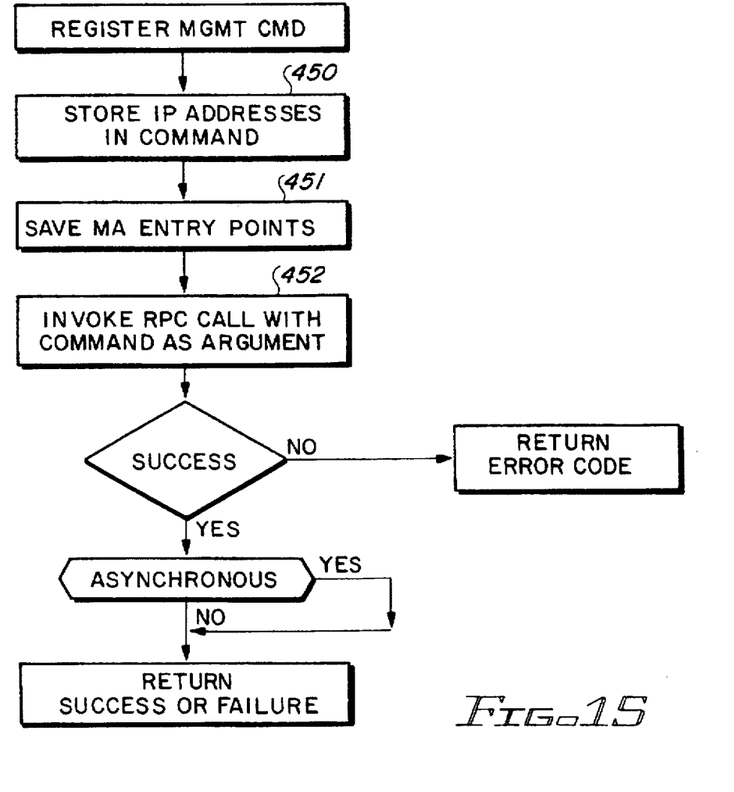
FIG. 15 shows the processing steps by client agents at nodes with management applications for invoking commands at the DMI node.

FIG. 15 shows the processing steps when a management application invokes a DMI command. The client code 402 will register the management command and store the network address in the command at step 450. The management application entry points are saved at step 451 and an RPC call is invoked with the command as an argument at step 452. When the requested data is returned, it is passed on to the management application program. If asynchronous operation is in effect, only an indication of success or failure is provided. If the obtainment of the data was successful, then at the appropriate point the client code 402 will request the data and receive it from the server. At that point the data can then be passed back to the management application.

The inventive technique for moving the management interface and the component interface out to other nodes in the network enables the use of the DMI in network systems. As a result, a multiple number of nodes on the network can be located at the most advantageous location for managing a complex operation. A node may be placed in a supervisor's office and another on the plant floor, all asking for and getting information from the same database. This invention also allows for instrumented components to be moved to the nodes at which devices are located. In that manner an instrumented component for an inserter machine can reside at the inserter. By moving the component interface to the device, the instrumented component can be prepared by the component manufacturer, maintained by the component manufacturer and thereby enable the obtainment of information in the most efficient fashion.

While the invention has been described above with respect to a specific embodiment it will be understood by those skilled in the art that various changes in form and detail may be made therein without departing from the spirit and scope of the invention. Again, changes in form and detail do not depart from the spirit and scope of the invention which receives definition in the following claims.

What is claimed:

1. A method of extending the Desktop Management Interface (DMI) at one node to a network comprising:

providing a pseudo management interface at each non-DMI node of said network where management applications reside to preserve the syntax and semantics of the DMI to interface with a management application;

providing a pseudo component interface at each non-DMI node of said network where device components reside to preserve the syntax and semantics of the DMI to interface with a device component; and providing a network server interface at said one node to act as a proxy management application and a proxy component for said DMI.

2. A method of extending the facilities of the Desktop Management Interface (DMI) System for managing the components of a stand-alone desktop computer to managing complex machinery and software components connected a network upon which nodes have a variety of components such as controllers for complex machinery, complex computing equipment, complex software, as well as other desktop computing equipments, so that the facilities of the DMI may be used to manage the array of components connected into the network by management applications located at nodes on the network, said method comprising:

providing a DMI system for use on a computing system adapted for connection as a DMI node on a network; and providing a network server for use within said computing system, said network server capable of interfacing with said DMI system as a proxy for management applications located at other nodes on the network as though the management applications were at the DMI node, and capable of interfacing with said DMI system as a proxy for components located at other nodes on the network as though the components were at the DMI node.

3. The method of claim 2 wherein said network server is adapted for receiving calls from other nodes on the network for providing data including DMI commands from which said network server can issue said DMI commands to address said DMI system.

4. The method of claim 3 wherein said network server is capable of performing steps comprising:

receiving calls from other nodes on the network;

parsing received data;

determining the DMI command from the received data; and issuing the DMI command to the DMI system.

5. The method of claim 3 wherein a management client server is adapted for use at a non-DMI node on a network to act as said proxy interface for a DMI system so that management applications can interact with said management client server as though said management client server were a DMI system at that node, said management client server capable of performing steps comprising:

registering a management command received from a management application;

storing the network address of the node with the management command;

saving management application entry points; and invoking a network call with the management command as an argument to pass data to said network server at the DMI node.

6. The method of claim 5 wherein said network server is capable of performing steps comprising:

receiving a call from a remote node on said network;

parsing received data;

determining the DMI command from said data; and issuing the DMI command to the DMI system.

7. The method of claim 5 further providing a component client server at a non-DMI node on said network to act as a proxy interface for a DMI system so that component instrumentation can interact with said component client server as though said component client server were a DMI system at that node.

8. The method of claim 7 wherein said component client server is capable of receiving data from said component instrumentation and invoking a remote procedure call to said network server to pass said data from said component instrumentation to said network server for posting said data in said DMI system.

9. The method of claim 8 wherein said network server is capable of performing steps comprising:

receiving a call from a remote node on said network;

parsing received data;

determining the DMI command from said data; and issuing the DMI command to the DMI system.

10. The method of claim 3 further providing a component client server at a non-DMI node on said network to act as a proxy interface for a DMI system so that component instrumentation can interact with said component client server as though said component client server were a DMI system at that node.

11. The method of claim 10 wherein said component client server is capable of receiving data from said component instrumentation and invoking a remote procedure call to said network server to pass said data from said component instrumentation to said network server for posting said data in said DMI system.

12. The method of claim 3 wherein data flow for responding to a management request issued at a first non-DMI node for a response provided by component instrumentation at a second non-DMI node includes:

at said first non-DMI node, providing the capability of fielding a request from a management application including a DMI command as though said DMI system were at said first non-DMI node by providing a management client server to act as a proxy management interface at said first non-DMI node, said management client server having the capability of invoking a network call to send said request over said network to said network server;

at said DMI node, providing said network server with the capability of receiving the transmission, unwrapping said DMI command from network protocol and acting as a proxy management application to issue said command to the service layer of said DMI system so that said service layer, in response to said DMI command, can address the request to the proper component for reply;

providing said network server, acting as a proxy for said component, with the capability of fielding said request from said service layer and with the further capability of invoking a network call to send said request over said network to said proper component at said second non-DMI node;

at said second non-DMI node, providing a component client server, acting as a proxy component interface at said second non-DMI node, with the capability of receiving said request and presenting it to component instrumentation;

after said component instrumentation develops a response to said request, providing said component client server with the capability of receiving said response from said component instrumentation by acting as a component interface and, having the capability of invoking a network call to send said response over said network to said DMI node;

at said DMI node, providing said network server with the capability of receiving said response and acting as a proxy component to present said response to said service layer so that said service layer can send the response to said network server acting as a proxy management application;

providing said network server with the capability of invoking a network call to send said response over said network to said management client server at said first non-DMI node;

at said first non-DMI node, providing said management client server, acting as a management interface, with the capability of presenting said response to said management application.

13. A system for extending the facilities of the Desktop Management Interface (DMI) for managing the components of a stand-alone desktop computer to managing components at nodes on a network where said components may include controllers for complex machinery, mainframe computing equipment, complex software, as well as desktop computing equipment, so that the facilities of the DMI may be used to manage the array of components connected into the network by management applications at nodes on the network, said system comprising:

said network;

a DMI node on said network;

a network server located at said DMI node, said network server including:

means for interfacing with said DMI as a proxy for management applications located at other nodes on said network as though the management applications were at the DMI node; and means for interfacing with said DMI as a proxy for components located at other nodes on said network as though the components were at the DMI node.

14. The system of claim 13 wherein said network server further includes:

means for receiving calls from other nodes on said network; and means for generating DMI commands from said call with which to address said DMI.

15. The system of claim 14 further including a component client server at non-DMI nodes to act as a proxy component interface wherein component instrumentation can interact with said component client server as though said component client server were a DMI system at the non-DMI node.

16. The system of claim 14 further including a management client server at non-DMI nodes to act as a proxy management interface wherein management applications can interact with said management client server as though said management client server were a DMI system at the non-DMI node, said management client server comprising:

means for registering a management command received from a management application;

means for storing the network address of the non-DMI node;

means for saving management applications entry points; and means for invoking a network call with the management command as an argument to pass data to said network server at the DMI node.

17. The system of claim 16 further including a component client server at non-DMI nodes to act as a proxy component interface wherein component instrumentation can interact with said component client server as though said component client server were a DMI system at the non-DMI node.

* * * * *

UNITED STATES PATENT AND TRADEMARK OFFICE
CERTIFICATE OF CORRECTION

PATENT NO. : 5,758,074
DATED : May 26, 1998
INVENTOR(S) : Marlin et al.

It is certified that error appears in the above-identified patent and that said Letters Patent is hereby corrected as shown below:

In the Claims
   Col. 17, line 28: after "connected" insert --into--
   Col. 17, line 62: change "a" (second instance) to --said--
   Col. 17, line 63: change "said" to --a--

Signed and Sealed this

Twenty-eighth Day of December, 1999

Attest:

Q. TODD DICKINSON

*Attesting Officer*     *Acting Commissioner of Patents and Trademarks*